US00RE44228E

(19) United States
(12) Reissued Patent
Park et al.

(10) Patent Number: US RE44,228 E
(45) Date of Reissued Patent: May 21, 2013

(54) SWITCHING MODE POWER SUPPLY AND DRIVING METHOD

(75) Inventors: Young-Bae Park, Anyang (KR); Gwan-Bon Koo, Bucheon (KR)

(73) Assignee: Fairchild Korea Semiconductor, Ltd., Bucheon (KR)

(21) Appl. No.: 13/410,228

(22) Filed: Mar. 1, 2012

Related U.S. Patent Documents

Reissue of:
(64) Patent No.: 7,672,146
Issued: Mar. 2, 2010
Appl. No.: 11/807,460
Filed: May 29, 2007

(30) Foreign Application Priority Data

Oct. 13, 2006 (KR) ..... 10-2006-0099771

(51) Int. Cl.
*H02M 3/335* (2006.01)

(52) U.S. Cl.
USPC ..... 363/21.01; 363/97

(58) Field of Classification Search ..... 363/20, 363/21.01, 21.04, 21.08, 21.1, 21.11, 21.12, 363/21.16, 21.18, 95, 97
See application file for complete search history.

(56) References Cited

U.S. PATENT DOCUMENTS

| | | | | |
|---|---|---|---|---|
| 5,845,019 | A | 12/1998 | Yoshizawa et al. | |
| 5,909,363 | A * | 6/1999 | Yoon | 363/21.16 |
| 5,959,851 | A * | 9/1999 | Shutts | 363/21.18 |
| 6,252,783 | B1 * | 6/2001 | Huh et al. | 363/21.01 |
| 6,845,019 | B2 * | 1/2005 | Kim et al. | 363/21.16 |
| 6,853,563 | B1 | 2/2005 | Yang et al. | |
| 6,900,995 | B2 * | 5/2005 | Muegge et al. | 363/21.05 |
| 7,035,122 | B2 * | 4/2006 | Kim et al. | 363/21.18 |
| 7,064,968 | B2 * | 6/2006 | Choi et al. | 363/97 |
| 7,505,287 | B1 * | 3/2009 | Kesterson | 363/21.01 |
| 7,672,146 | B2 * | 3/2010 | Park et al. | 363/21.01 |

* cited by examiner

*Primary Examiner* — Adolf Berhane
(74) *Attorney, Agent, or Firm* — Sidley Austin LLP

(57) ABSTRACT

A switching mode power supply includes a switching transistor, coupled to a primary coil at a primary side of a transformer for converting an input DC voltage, supplying power to a secondary and a tertiary coil at a secondary side of the transformer according to an operation of the switching transistor; a switching controller receiving a feedback voltage corresponding to a first voltage generated in the secondary coil and receiving a detection signal corresponding to a current of the switching transistor to generate a switching control signal for controlling the turn on/off of the switching transistor; and a feedback signal generator receiving the first voltage and the switching control signal to set a sampling period, and storing the first voltage, sampled with a last pulse of the first pulse string within the sampling period as a feedback voltage. The output voltage is thereby accurately detected without opto-couplers or shunt regulators.

63 Claims, 6 Drawing Sheets

SWITCHING MODE POWER SUPPLY AND DRIVING METHOD

Matter enclosed in heavy brackets [ ] appears in the original patent but forms no part of this reissue specification; matter printed in italics indicates the additions made by reissue.

CROSS-REFERENCE TO RELATED APPLICATION

This application claims priority to and the benefit of Korean Patent Application No. 10-2006-0099771 filed in the Korean Intellectual Property Office on Oct. 13, 2006, the entire contents of which are incorporated herein by reference.

BACKGROUND OF THE INVENTION

1. Field of the Invention

The present invention relates to a switching mode power supply and its method of driving.

2. Description of the Related Art

A switching mode power supply (hereinafter referred to as an "SMPS") is a device that rectifies an input AC voltage to an output DC voltage (DC-link voltage) and that converts the input DC voltage to an output DC voltage having another level. The output DC voltage can be higher or lower than the input DC voltage. SMPSs are often used in battery powered devices such as power electric devices, mobile phones and laptop computers.

In general, an SMPS can include a transformer and has a switching transistor at a primary side of a transformer that receives a DC voltage and controls the duty of the switching transistor. SMPSs can use a feedback loop to transfer a voltage or a current of an output unit to the primary side of the transformer e.g. through an opto-coupler or through a shunt regulator that is connected to the output side of the transformer. Application of such transfer loops allows delivering a regulated output DC voltage through the output unit.

However, since opto-couplers and shunt regulators are expensive and large, it is difficult to highly integrate SMPSs into circuits and contain cost.

SUMMARY OF THE INVENTION

An embodiment of the present invention provides a switching mode power supply, including: a power supply unit that includes a switching transistor that is coupled to a primary coil at a primary side of a transformer for converting an input DC voltage and that supplies power to a secondary coil and a tertiary coil at a secondary side of the transformer according to an operation of the switching transistor; a switching controller that receives a feedback voltage corresponding to a first voltage generated in the secondary coil at the secondary side of the transformer and receives a detection signal corresponding to a current flowing to the switching transistor to generate a switching control signal for controlling the switching transistor to turn on/off; and a feedback signal generator that receives the first voltage and the switching control signal to set a sampling period and that stores a voltage level of the first voltage that is sampled with a last pulse of the first pulse strings within the sampling period as a feedback voltage using a plurality of pulse strings including a first pulse string and a second pulse string having a plurality of pulses.

Another embodiment of the present invention provides a switching mode power supply for generating an output DC voltage by converting a DC voltage, including: a PWM controller that includes a switching transistor with a first stage connected to an input terminal of a DC voltage and that controls the switching transistor to drive according to a voltage level of a first voltage corresponding to the output DC voltage; an output unit that includes an inductor with one end connected to a second stage of the switching transistor, a capacitor with one end connected to the other end of the inductor, and a diode with an anode connected to the other end of the capacitor and with a cathode connected to one end of the inductor and that generates the output DC voltage according to turning on/off of the switching transistor; and a voltage distribution unit that distributes a voltage that is applied to both ends of the inductor to generate the first voltage. The PWM controller includes a switching controller that receives a feedback voltage corresponding to the first voltage to generate a switching control signal for controlling the switching transistor to turn on/off, and a feedback signal generator that receives the switching control signal and the first voltage to set a sampling period and that stores a voltage level of the first voltage that is sampled with a last pulse of the first pulse strings within the sampling period as a feedback voltage using a plurality of pulse strings including a first pulse string and a second pulse string having a plurality of pulses.

Yet another embodiment of the present invention provides a driving method of a switching mode power supply that supplies power to a secondary coil at a secondary side of a transformer according to an operation of a switching transistor that is coupled to a primary coil at a primary side of the transformer and that generates an output DC voltage by converting an input DC voltage of a primary side of the transformer, wherein the secondary side of the transformer includes the secondary coil, a first diode with an anode connected to one end of the secondary coil, and a first capacitor with a first stage connected to a cathode of the first diode and with a second stage connected to a ground stage and the other end of the secondary coil, The driving method includes (a) setting a sampling period; (b) sampling a voltage level of the first voltage that is generated at the secondary side of the transformer using a plurality of pulse strings including a first pulse string having a plurality of pulses; and (c) generating a switching control signal that controls the switching transistor to turn on/off using a voltage level that is sampled with a last pulse of the first pulse strings within the sampling period as a feedback voltage among voltage levels that are sampled at step (b).

A further embodiment of the present invention provides a driving method of a switching mode power supply for generating an output DC voltage by converting a DC voltage, wherein the switching mode power supply is a non-isolated switching mode power supply that changes the output DC voltage that is output through an output unit according to an operation of a PWM controller that includes a switching transistor with a first stage connected to an input terminal of the DC voltage, and the output unit includes an inductor with one end connected to a second stage of the switching transistor, a capacitor with one end connected to the other end of the inductor, and a first diode with an anode connected to the other end of the capacitor and with a cathode connected to one end of the inductor. The driving method includes (a) setting a sampling period; (b) sampling a voltage level of the first voltage that is generated by distributing a voltage that is applied to both ends of the inductor using a plurality of pulse strings including a first pulse string having a plurality of pulses; and (c) generating a switching control signal that controls the switching transistor to turn on/off using a voltage level that is sampled with a last pulse of the first pulse strings within a sampling period as a feedback voltage among voltage levels that are sampled at step (b).

DETAILED DESCRIPTION

Figure 1:
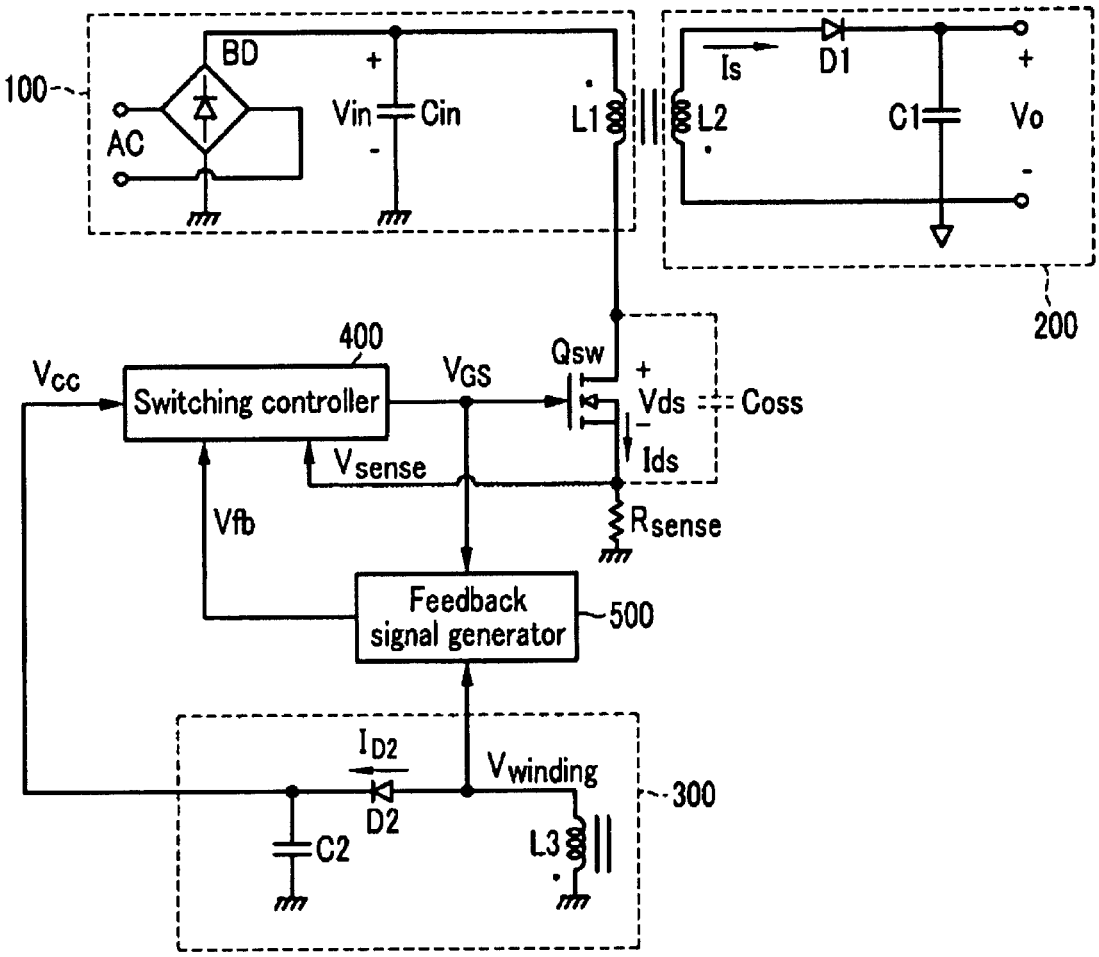
FIG. 1 is a diagram illustrating an isolated SMPS according to an embodiment of the present invention.

Switching mode power supplies according to embodiments of the present invention accurately detect an output DC voltage of an output unit without an opto-coupler or a shunt regulator.

In the following detailed description, only certain embodiments are described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims, when an element is described as "coupled" to another element, the element may be directly coupled to the other element, or it can be indirectly coupled to the other element through a third element.

FIG. 1 illustrates an SMPS. The SMPS can include a power supply unit 100, an output unit 200, a bias voltage supply unit 300, a switching controller 400, and a feedback signal generator 500.

The power supply unit 100 can include a bridge diode BD for rectifying an AC input, a capacitor Cin for smoothing the rectified voltage, a primary coil L1 of a transformer with one end connected to the capacitor Cin, and the other end to a switching transistor Qsw and a sense resistor. The power supply unit 100 converts the AC input voltage to a DC voltage Vin by the bridge diode BD and the capacitor Cin and supplies power to a secondary side, i.e., the output unit 200 of the transformer, according to the duty of the switching transistor Qsw.

The output unit 200 can include a secondary coil L2 of the transformer, a diode D1 with an anode connected to one end of the secondary coil L2 of the transformer, and a capacitor C1, connected between a cathode of the diode D1 and a ground. The voltage between the two terminals of the capacitor C1 is the output voltage Vo.

The bias voltage supply unit 300 can include a coil L3 on the secondary side of the transformer, a diode D2 with an anode connected to one end of the coil L3, and a capacitor C2 connected between a cathode of the diode D2 and a ground.

The switching controller 400 can be an integrated circuit (IC). The bias voltage supply unit 300 supplies a bias voltage Vcc for operating the IC in the following manner. As the switching transistor Qsw repeatedly turns on and off, the coil L3, the diode D2 and the capacitor C2 together generate a bias voltage Vcc.

The switching controller 400 can receive a feedback signal Vfb from the feedback signal generator 500, and a signal Vsense that senses a current flowing through the switching transistor Qsw (hereinafter referred to as Ids). The switching controller 400 can compare the feedback signal Vfb with the Vsense signal and generate a pulse width modulation signal according to a result of the comparison to output a gate control signal (hereinafter referred to as $V_{GS}$) for controlling the switching transistor Qsw.

The feedback signal generator 500 can receive a "Vwinding" voltage of the coil L3 and $V_{GS}$ to generate a feedback signal Vfb and transfer the feedback signal Vfb to the switching controller 400. Here, the feedback signal Vfb is a signal having information corresponding to the output voltage Vo and is used to determine a turn-off time of the switching transistor Qsw.

The switching controller 400, the feedback signal generator 500, and the switching transistor Qsw may be formed on one chip or on separate chips.

Figure 2:
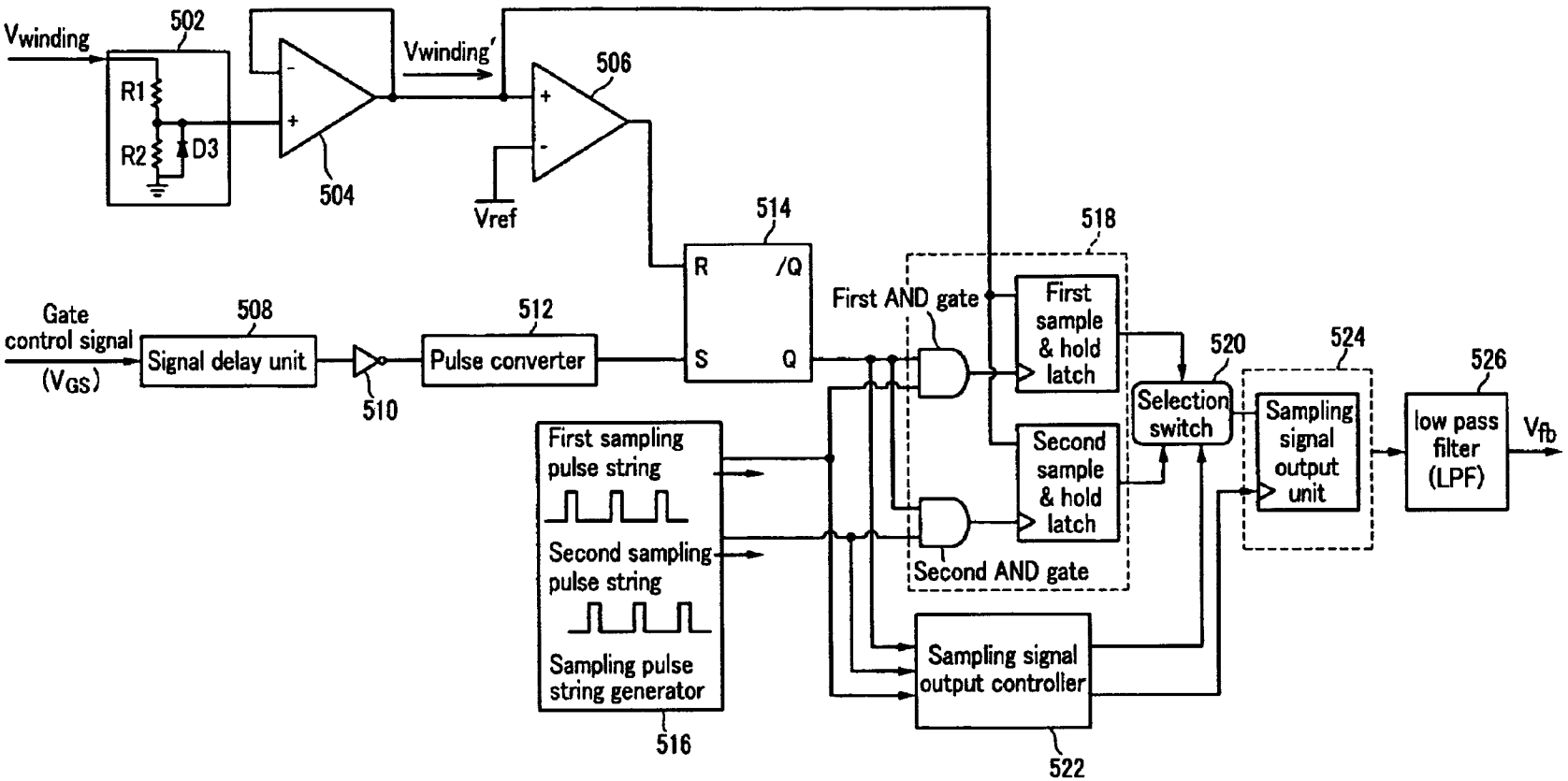
FIG. 2 is a diagram illustrating a feedback signal generator according to an embodiment of the present invention.

FIG. 2 illustrates an embodiment of the feedback signal generator 500. The feedback signal generator 500 can include a voltage distribution unit 502, a buffer 504, a comparator 506, a signal delay unit 508, an inverter 510, a pulse converter 512, an SR latch 514, a sampling pulse string generator 516, a sampling unit 518, a selection switch 520, a sampling signal output controller 522, a sampling signal output unit 524, and a low pass filter 526.

The voltage distribution unit 502 can include a resistor R1 with one terminal connected to an input voltage, a resistor R2 with one terminal connected to a node shared with the other terminal of the resistor R1 and the other terminal connected to a ground, and a diode D3 with an anode connected to the ground and a cathode connected to the node shared by the resistors R1 and R2. The input voltage can be the Vwinding voltage. The voltage distribution unit 502 scales down the Vwinding voltage according to the resistor ratio R1 over R2 and outputs the scaled down voltage to a non-inverting input terminal of the buffer 504. If the Vwinding voltage becomes less than a predetermined level, the diode D3 prevents a negative voltage from being applied to the non-inverting input terminal of the buffer 504.

The buffer 504 can output its input signal without an impedance related loss. The non-inverting input terminal of the buffer 504 is connected to an output terminal of the voltage distribution unit 502, and the inverting input terminal is connected to the output terminal of the buffer 504 as a voltage follower to receive a feedback signal from the output terminal. Hereinafter, the output signal of buffer 504 referred to as Vwinding' signal.

The comparator 506 can compare a magnitude of an input signal of the non-inverting input terminal and that of an input signal of the inverting input terminal and output a digital signal of "1" or "0" according to the comparison result. If a signal that is input to the non-inverting input terminal is greater than a signal that is input to the inverting input terminal, the comparator 506 outputs "1", and if a signal that is input to the non-inverting input terminal is smaller than a signal that is input to the inverting input terminal, the comparator 506 outputs "0". The inverting input terminal of the comparator 506 can be connected to an output terminal of the buffer 504, and the non-inverting input terminal can be connected to a reference voltage. Here, the reference voltage can be set to a ground voltage or a voltage that is higher by a predetermined level than the ground voltage.

The signal delay unit 508 can receive $V_{GS}$ and output it with a predetermined delay.

The inverter 510 can receive an output signal of the signal delay unit 508, invert its phase, and transfer the inverted signal to the pulse converter 512.

The pulse converter 512 can generate a signal that has a short low level interval synchronized with a rising edge of a signal that is input from the inverter 510 and that sustains a high level in the remaining interval.

A reset terminal R of the SR latch 514 can be connected to an output terminal of the comparator 506, and a set terminal S thereof can be connected to an output terminal of the pulse converter 512. The SR latch 514 can be formed with a NAND flip-flop. The SR latch can output a result of a logical operation to the sampling unit 518 and the sampling signal output controller 522 through a non-inverting output terminal Q.

The sampling pulse string generator 516 can include two pulse string generators, and can generate and output a first and a second sampling pulse strings that are toggled with different timing using the two pulse string generators. Here, a pulse string can be a pulse group that is continuously toggled with a predetermined frequency. In some embodiments the toggling can be piece-wise continuous.

The sampling unit 518 can include first and second sample and hold latches and first and second AND gates. The first and second AND gate can receive an output signal of the non-inverting output terminal Q of the SR latch 514 and the first and the second sampling pulse strings that are output from the sampling pulse string generator 516, respectively. The first and second AND gates can perform an AND operation on their inputted signals. The first and second AND gates output a timing signal to corresponding clock signal input terminals of the first and second sample and hold latches for controlling a sampling operation time. The first and second sample and hold latches sample a Vwinding' signal that is output from the buffer 504 and hold the sampled Vwinding' signal until a next timing signal is input. The first and second sample and hold latches erase the Vwinding' signal previous sampled and start holding the new Vwinding' signal when a new sampling operation is started.

While in the shown embodiment the number N of sample and hold latches and AND gates is two, in other embodiments N can be more than two. Those embodiments also have N sampling pulse strings outputted by the sampling pulse string generator 516. Such embodiments can perform the sampling operation with more precise timing.

The selection switch 520 receives a switching control signal from the sampling signal output controller 522 and Vwinding' signals outputted by the plurality of sample and hold latches that are included in the sampling unit 518. The selection switch 520 selects and transfers the Vwinding' signal held by a selected sample and hold latch to the sampling signal output unit 524.

The sampling signal output controller 522 can receive the output signal, outputted at the non-inverting output terminal Q of the SR latch 514 and the N sampling pulse strings of the sampling pulse string generator 516. The sampling signal output controller 522 can generate a switching control signal and a timing signal. The switching control signal is a signal for controlling the selection switch 520 in order to select one of output signals of the N sample and hold latches that are included in the sampling unit 518 and transfer the signal to the sampling signal output unit 524. The timing signal is a signal for controlling the driving timing of the sampling signal output unit 524.

The sampling signal output unit 524 can receive one of the Vwinding' signals that are output from one of the N sample and hold latches according to a switching operation of the selection switch 520, driven by the sampling signal output controller 522. The sampling signal output unit 524 transfers the Vwinding' signal to the low pass filter (LPF) 526. If a driving timing signal is applied by the sampling signal output controller 522, the sampling signal output unit 524 can change the Vwinding' signal transferring from the sampling signal that has been being output, to the Vwinding' signal that is input from the sampling unit 518 at the instance when the driving timing signal is applied, and output the new Vwinding' signal to the low pass filter 526. Here, the sampling signal output unit 524 holds a Vwinding' signal that is received from the sampling unit 518 until a next driving timing signal is applied, and substantially continuously outputs a holding signal to the low pass filter 526.

The low pass filter 526 can prevent a signal that is output from the sampling signal output unit 524 from abruptly changing due to a level change of a Vwinding' signal that is input from the sampling unit 518 to the sampling signal output unit 524 through the selection switch 520. In detail, when the Vwinding' signal of the sampling signal output unit 524 changes abruptly—with high frequency components above a predetermined frequency—the low pass filter 526 generates an approximately linearly changing signal by filtering out the high frequency components, and transfers the signal as a feedback signal Vfb to the switching controller, labeled 400 in FIG. 1.

Figure 3:
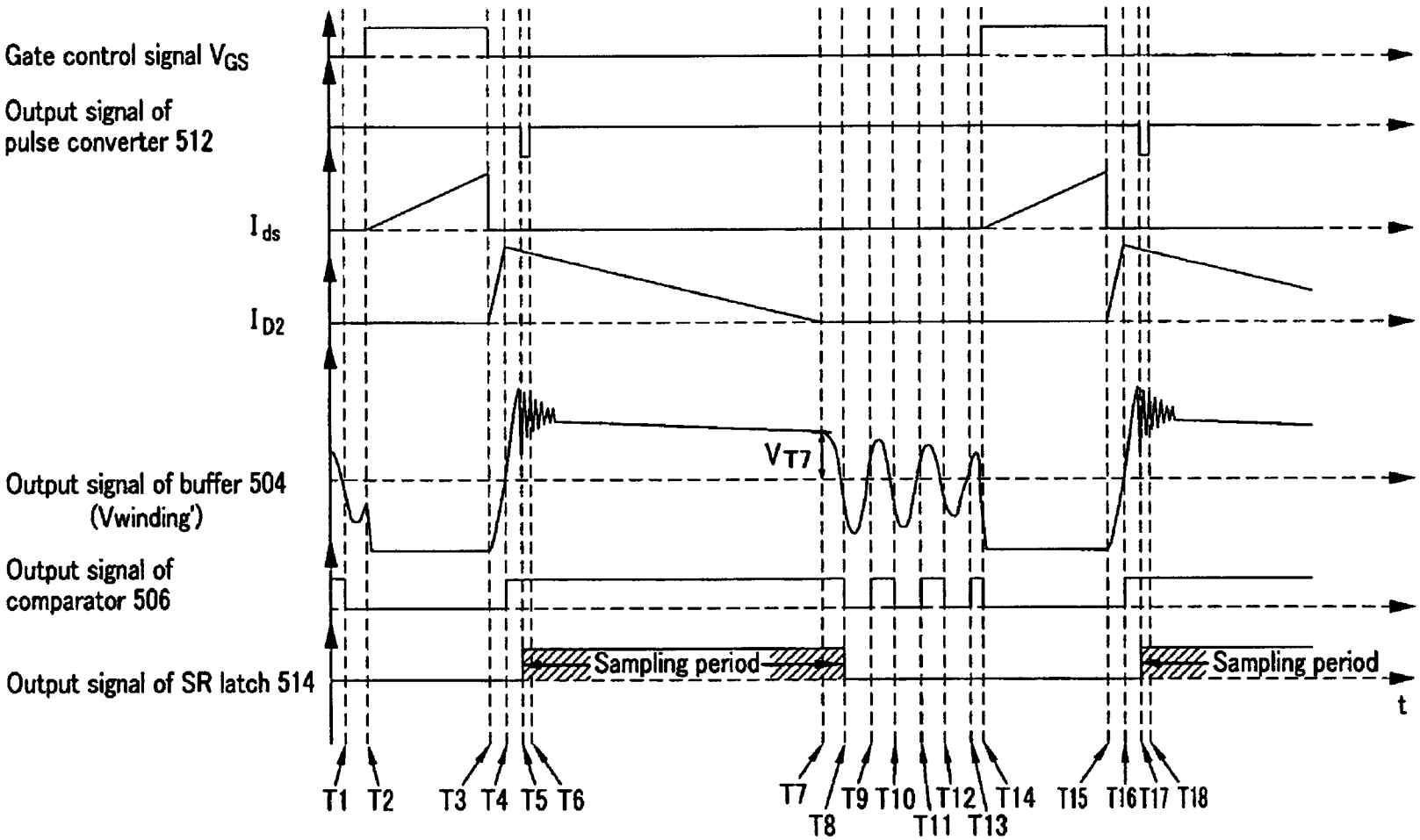
FIG. 3 is a diagram illustrating output signals of buffer 504, comparator 506, pulse converter 512 and SR latch 514 in accordance with the change of $V_{GS}$, Ids and $I_{D2}$.

FIG. 3 illustrates output signals of buffer 504, comparator 506, pulse converter 512 and SR latch 514 in accordance with the change of $V_{GS}$, Ids and $I_{D2}$. In what follows, the terminology "high" and "low" will be used. These terms were meant to make a connection to a digital terminology. In different embodiments the associated actual voltage may be different. Also, these high level and low level signals may vary in time to some limited degree. In some embodiments they are only defined with a tolerance to be recognized as digital high and low signals.

The primary coil L1 of the transformer and an output capacitor Coss between a drain and a source of the switching transistor Qsw generate a resonant signal as switching transistor QSW is turned on and off substantially periodically. Because coils L1 and L3 share the core of the transformer, the Vwinding voltage also follows a resonant waveform. Referring to FIG. 2, the resonant Vwinding voltage is input into voltage distribution unit 502. The signal, output by the voltage distribution unit 502 into the buffer 504, also follows a resonant waveform. At time T1 the output voltage of the buffer 504 sinks below a reference voltage. Therefore, at T1 the output signal of the comparator 506, which compares the reference voltage with the output signal of the buffer 504, changes from a high level to a low level. This output signal is input into the R terminal of the SR latch 514.

The $V_{GS}$ is low at T1. $V_{GS}$ is fed through the signal delay unit 508, the inverter 510 and the pulse converter 512 into the S terminal of the SR latch 514. According to its R and S input signals, the output signal at the non-inverting output terminal Q of the SR latch 514 is low.

At time instance T2, the $V_{GS}$ changes from low to high and therefore the switching transistor Qsw is turned on. The switching transistor QSW turning on disrupts the resonance of the L1-Coss resonator and the resonant waveform of the Vwinding voltage and therefore the output voltage of the buffer 504. Thus the output voltage of the buffer 504 goes low, lowered by a predetermined level below the reference voltage Vref. Further, at T2 a current Ids, flowing from a drain to a source of the switching transistor Qsw, starts to increase.

At time T3, the $V_{GS}$ goes low and the switching transistor Qsw is turned off. The output voltage of the buffer 504 begins to rise. The current of the diode D2 (hereinafter referred to as $I_{D2}$) begins to increase proportional to a voltage that is induced in the secondary coil L3 of the bias voltage supply unit 300.

At time T4, the output voltage of the buffer 504 exceeds a reference voltage Vref, whereby the output signal of the comparator 506 changes from low to high. However, the output signal of the pulse converter 512 does not change because of the signal delay caused by the inverter 510 and the pulse converter 512. Therefore, the input signal at the S terminal of the SR latch 514 does not change and thus the output at the non-inverting output terminal Q of the SR latch 514 does not change either. At this time T4 the current $I_{D2}$ of the diode D2 begins to decrease.

At time T5, the output signal of the pulse converter 512 changes from high to low, the input signal at terminal s changes and thus the output signal of the non-inverting output terminal Q of the SR latch 514 changes from low to high.

At time T6, the output signal of the pulse converter 512 changes from low to high, while the input at the R terminal remains high. Thus, the output signal of the non-inverting output terminal Q of the SR latch 514 remains high.

At time T7, the current $I_{D2}$, which decreased since the time T4, reaches approximately zero. This can restart the resonance of Vwinding and hence the output voltage of the buffer 504.

At time T8, the output voltage of the buffer 504 falls to (or below) the reference voltage Vref in the course of the resonant time dependence. Accordingly, the output signal of the comparator 506 changes from high to low, whereby an output signal of the non-inverting output terminal Q of the SR latch 514 changes to low.

In the subsequent interval T9 to T13, the output voltage of the buffer 504 repeatedly oscillates above and below the reference voltage Vref, thus the output signal of the comparator 506 repeatedly fluctuates between high and low. During this interval the output signal of the non-inverting output terminal Q of the SR latch 514 remains low, because the S input remains high. From time T14 the signals repeat the waveforms starting at T1.

Next, the generation of the feedback signal Vfb of the feedback signal generator 500 of FIG. 1 during the interval T3 to T8 will be described in detail.

First, a drain-source "Vds voltage", applied between the drain and source of the switching transistor Qsw equals the sum of the DC voltage Vin, applied to the capacitor Cin and the voltage that is generated in the primary coil L1 of the transformer.

As the switching transistor Qsw is turned off, a voltage of the output capacitor Coss between a drain terminal and a source terminal of the switching transistor Qsw increases until a direction of a current flowing to the primary coil L1 of the transformer changes. As the direction of a current flowing to the primary coil L1 of the transformer changes, resonance is generated between the output capacitor Coss and a leakage inductance component of the primary coil L1 of the transformer, whereby a Vds voltage is resonated within a predetermined voltage range for a predetermined period.

As the switching transistor Qsw is turned off, a voltage is generated in a secondary coil L2 of the transformer. This induces a current in the secondary coil L2. When the current of L2 flows to the capacitor C1 via the diode D1, the voltage in secondary coil L2 falls by a predetermined level. This decreasing voltage is reflected from the secondary coil L2 to the primary coil L1, causing the Vds voltage to fall. During this interval the voltage that is reflected from the secondary coil L2 to the primary coil L1 of the transformer is substantially the same as a sum of the voltage of the diode D1 and the voltage of the capacitor C1. The Vds voltage falls in proportion to an amount of current flowing through the diode D1. When a current flowing to the diode D1 becomes substantially zero, Vds exhibits a resonant waveform because of the resonance of the primary coil L1 and the output capacitor Coss. The resonance starts substantially at time T7.

At time T7, the voltage that is reflected from the secondary coil L2 to the primary coil L1 is proportional to an output voltage, also appearing across capacitor C1:

$$\frac{n_{PRIMARY}}{n_{SEC}} \cdot V_o = V_o' \tag{1}$$

where $n_{PRIMARY}$ is a number of windings of the primary coil L1, $n_{SEC}$ is a number of windings of the secondary coil L2, $V_o$ is the output voltage and $V_o'$ is the voltage that is reflected from the secondary coil L2 to the primary coil L1.

The Vds voltage at time T7 is substantially the same as a sum of a DC voltage Vin and the reflected voltage Vo'. The Vwinding voltage that is induced in the coil L3 is lower than Vds voltage by the DC voltage Vin at time T7. At this time, the Vwinding voltage is proportional to a winding number ratio of the coil L3 and the secondary coil L2:

$$\frac{n_{VCC}}{n_{SEC}} \cdot V_o = V_o'' \tag{2}$$

where $n_{VCC}$ is a number of windings of the coil L3 and $V_o''$ is the voltage reflected from the coil L2 to the primary coil L1. The Vwinding voltage is proportional to the reflected voltage Vo", and the winding ratio among the coils L1, L2 and L3 is predetermined. A precise value of the voltage Vo is shown at time T7, and the voltage Vo is proportional to the Vwinding voltage through Equations (1)-(2).

The feedback signal generator 500 receives the Vwinding voltage and the $V_{GS}$ and outputs the feedback signal Vfb that corresponds to the Vwinding' signal proportional to the Vwinding voltage about the time T7. The switching controller 400 receives the feedback signal Vfb, compares the feedback signal Vfb with the sensing voltage Vsense to adjust the duty or on-time of the switching transistor Qsw, thereby controlling an output voltage Vo.

During T2-T14, the full period of the switching transistor Qsw, the SR latch 514 remains high in the T5-T8 interval. This interval is a sampling period in which at least one of the sample and hold latches of the sampling unit 518 samples the output signal of the buffer 504 whenever a signal level of the sampling pulse string that is input from the sampling pulse string generator 516 becomes high.

During a sampling period, the number of first and second sample and hold latches, that are driven according to a signal level of a sampling pulse string that is input to the first and second AND gates from one of the corresponding sampling pulse string generators. During a sampling period, the first and second sample and hold latches output a Vwinding' signal, which is sampled within a toggling interval of the sampling pulse string that is toggled with different timing.

Because each of the sample and hold latches hold only one sampling signal at a given time, when a next sampling signal is input, the sample and hold latches and holds the newly input sampling signal instead of holding the previous sampling signal.

The sampling signal output controller 522 selects one of the sampling signals that are held in the sample and hold latches during a sampling period and outputs the signal to the sampling signal output unit 524 by controlling a switching operation of the selection switch 520.

At time T8, when an output signal of the non-inverting output terminal Q of the SR latch 514 changes from high to low, the sampling signal output controller 522 senses that a sampling period ended. When the sampling period ends, the sampling signal output controller 522 outputs the sampling signal of the corresponding sample and hold latch to the sampling signal output unit 524 by connecting the selection switch 520 to an output terminal of the corresponding sample and hold latch that holds a sampling signal corresponding to a pulse, preceding the signal at time T8.

In the course of the above operation, the sampling signal output unit 524 can store information such as the number of sampling pulse string generators that are included in the sampling pulse string generator 516, an input order of sampling pulses that are input from the sampling pulse string generators, and the correspondence between the sample and hold latches and the sampling pulse string generators.

The sampling signal output controller 522 has a number of sampling pulse string input terminals corresponding to the number of sampling pulse string generators, and receives the sampling pulse string that is output from each sampling pulse string generator through a different input terminal. The sampling signal output controller 522 stores a sampling pulse input order for receiving sampling pulses until the same number of sampling pulses are input as there are input terminals. The sampling signal output controller 522 senses and inputs at an input terminal that sampling pulse which is immediately previous to a sampling pulse, which immediately precedes time T8. The sampling signal output controller 522 can determine which sample and hold latch holds the sampling signal corresponding to the sampling pulse that is immediately previous to a sampling pulse immediately preceding time T8, and transfer the holding signal of the sample and hold latch to sampling signal output unit 524 by controlling the selection switch 520. The sampling signal output unit 524 outputs the signal as the feedback signal Vfb to the switching controller 400 through the low pass filter 526. The sampling signal output controller 522 controls the selection switch 520 and simultaneously inputs a timing signal to the sampling signal output unit 524 for supplying the feedback signal Vfb to the switching controller 400 as soon as possible. Here, similarly to the sample and hold latches of the sampling unit 518, the sampling signal output unit 524 can hold only one sampling signal at a time, and outputs the sampling signal to the switching controller 400 until a next sampling signal is input. When a new sampling signal is input, the sampling signal output unit 524 changes the sampling signal held to the newly input sampling signal and outputs the new sampling signal to the switching controller 400 through the low pass filter 526.

The reason why the feedback signal generator 500 selects the sampling signal corresponding to the sampling pulse that is immediately previous of a sampling pulse which preceded time T8, is to select a voltage having most similar level to the Vwinding' signal at Time T7 (hereinafter, Vwinding' signal at the time T7 refers to $V_{T7}$) It is not easy to detect the $V_{T7}$, because the time when the current flowing through the diode D2 becomes zero could not be detected. As a resonance is generated at time T7, from the time T7 to the time T8 the signal Vwinding' falls with a steep slope as illustrated in FIG. 3. If the feedback signal generator 500 selects the sampling signal corresponding to the sampling pulse that immediately preceded time T8, the voltage detected as the feedback voltage Vfb has a high possibility of considerably differing from the $V_{T7}$. On the other hand, the Vwinding' voltage, which preceded time T7, is not considerably different from the $V_{T7}$. So, in some embodiments the sampling signal corresponding to the sampling pulse that is immediately previous of a sampling pulse immediately preceding time T8 is selected to minimize the difference. This operation will be illustrated in FIG. 4.

Figure 4:
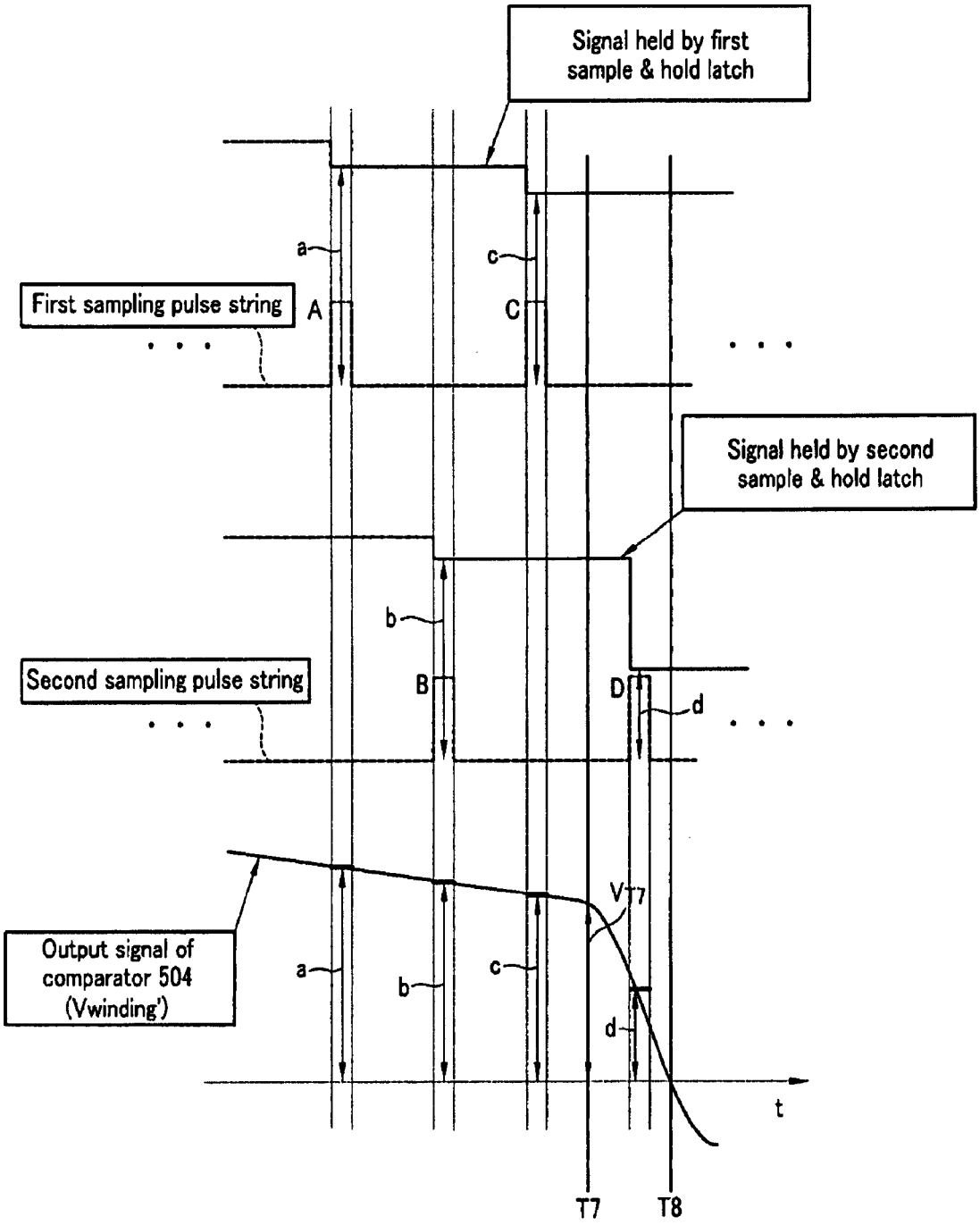
FIG. 4 is a diagram illustrating signals held by first and second sample & hold latch of the sampling unit 518 in accordance with the sampling signals.

FIG. 4 illustrates signals held by first and second sample & hold latch of the sampling unit 518 in accordance with the sampling signals. Here, the sampling signals of the sample and hold latches are labeled by a, b, c and d. These sampling signals are substantially equal to the Vwinding' signal at the sampling times corresponding to A, B, C and D. Here, A, B, C and D are sampling pulses generated by the sampling pulse string generator 516. More specifically, A and C are sampling pulses, which are parts of the first sampling pulse string generated by the first pulse string generator, and B and D are sampling pulses, which are parts of the second sampling pulse string generated by the second pulse string generator. The signals a, b, c and d illustrated in FIG. 4 are sampling signals to indicate respective voltage levels of the Vwinding' signal corresponding to the sampling pulses A, B, C and D.

At the time T8, the first sample/hold latch holds the sampling signal c, and the second sample/hold latch holds the sampling signal d. Because the sampling pulse D lies within the time interval T7-T8, the sampling signal d corresponding to the sampling pulse D is considerably different from the $V_{T7}$. On the contrary, because the sampling pulse C lies preceded time T7, the sampling signal c corresponding to the sampling pulse C is not considerably different from the $V_{T7}$. As the sampling signal output controller 522 transfers the sampling signal c to the sampling signal output unit 524 by controlling the selection switch 520, the Vfb is nearly same with the $V_{T7}$.

For reference, in some embodiments the sampling pulse D can exist even at the time T8. In these embodiments the voltage level c corresponding to the sampling pulse C is selected as the Vfb voltage by the sampling signal output controller 522. The just described feedback signal generating method, or analogues, can be applied to an isolated SMPS, which has a different architecture from that of FIG. 1, or even to a non-isolated SMPS.

Figure 5:
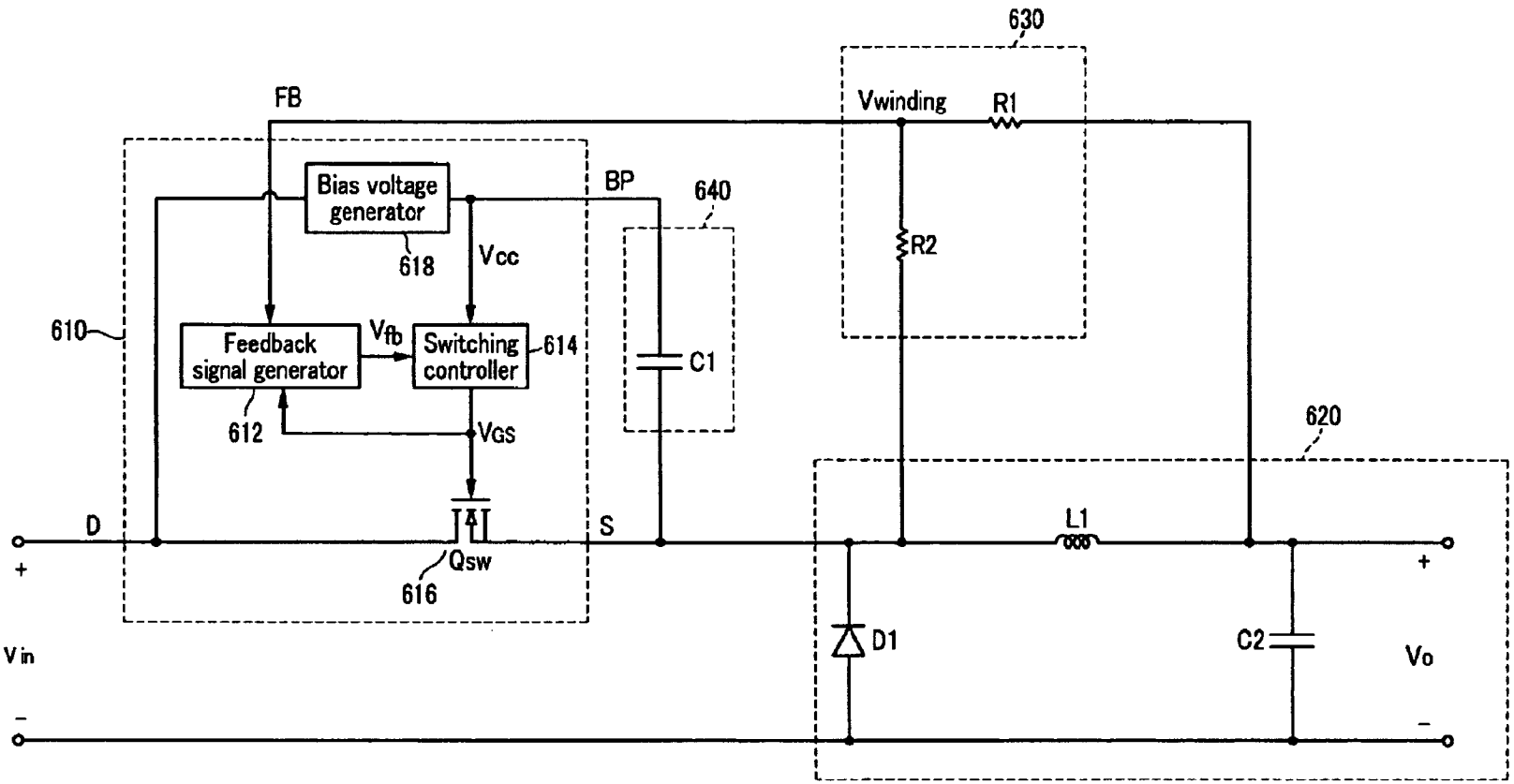
FIG. 5 is a diagram illustrating a configuration of an SMPS according to an embodiment of the present invention.

FIG. 5 is a diagram illustrating a configuration of a non-isolated SMPS. The non-isolated SMPS can include a pulse width modulation (PWM) controller 610, an output unit 620, a voltage distribution unit 630, and a bias voltage supply unit 640.

The PWM controller 610 can be embodied with one IC, and can include four input terminals: a drain terminal D, a source terminal S, a bypass terminal BP, and a feedback terminal FB.

The drain terminal D can be a terminal for inputting an input voltage Vin of the non-isolated SMPS. The source terminal S can output an output signal according to the turning on/off of the switching transistor 616 to the output unit 620 and the bias voltage supply unit 640. The bypass terminal BP can be connected to the bias voltage supply unit 640 to receive a driving voltage Vcc of a switching controller 614. The feedback terminal FB is a terminal for receiving a Vwinding voltage that is input from the voltage distribution unit 630. The PWM controller 610 can include a feedback signal generator 612, the switching controller 614, the switching transistor 616, and a bias voltage generator 618.

The feedback signal generator 612 can receive a Vwinding voltage through the feedback terminal FB and $V_{GS}$ of the switching transistor 616 to generate a feedback signal Vfb and transfers the feedback signal Vfb to the switching controller 614.

The switching controller 614 can receive a bias voltage through the bypass terminal BP, and the feedback signal Vfb to generate the $V_{GS}$, thereby controlling the turn on/off operation of the switching transistor 616. The switching controller 614 can be driven when the driving voltage Vcc, input from the capacitor C1 through the bypass terminal BP, is higher than a predetermined voltage.

The switching transistor 616 can receive an input voltage Vin through a drain that is connected to the drain terminal D of the PWM controller 610, and is turned on/off by the $V_{GS}$ that is input through a gate to output a signal through the source terminal S.

The bias voltage generator 618 can be connected to the drain terminal D, and is driven by the input voltage Vin that is input through the drain terminal D while the switching transistor 616 is turned off to charge the capacitor C1 that is connected to the bypass terminal BP.

The output unit 620 can include a diode D1 with a cathode connected to the source terminal S of the PWM controller 610, an inductor L1 with one end connected to the cathode of the diode D1, and a capacitor C2 with one end connected to the other end of the inductor L1, and the other end connected to the anode of the diode D1. The voltage of the capacitor C2 can also be an output voltage Vo.

The diode D1 can form a freewheeling path and allows a current to flow to the inductor L1 through a path passing through the capacitor C2 and the diode D1 if the switching transistor 616 of the PWM controller 610 is turned off.

The voltage distribution unit 630 can include resistors R1 and R2. A first terminal of resistor R1 and a first terminal of resistor R2 and be connected to the (above mentioned) two ends of the inductor L1 in the output unit 620. The second terminal of resistors R1 and R2 can be connected together.

The voltage distribution unit 630 can scale down the voltage across the inductor L1 according to the ratio of the resistors R1 and R2 to generate the Vwinding voltage at the shared terminal of the resistors. The Vwinding voltage can be transferred to the feedback terminal PB of the PWM controller 610.

The bias voltage supply unit 640 can include a capacitor C1 with one terminal connected to the source terminal S of the PWM controller 610 and with the other terminal connected to the bypass terminal BP.

The feedback signal generator 612 of the PWM controller 610 can be similar or analogous to the feedback signal generator 500 in FIG. 1, detailed in FIG. 2. The signal waveforms can be similar or analogous to the signals and waveforms shown in FIGS. 3 and 4.

The non-isolated SMPS can have a structure similar to a buck-direct feedback converter or a buck boost-direct converter. It need not use an expensive and large device such as an opto-coupler or a constant current LED driver that is often used to form a feedback loop. Further, unlike a buck-direct feedback converter or a buck boost-direct converter, the non-isolated SMPS can directly distribute a voltage across the inductor L1 of the output unit 620, transfers the voltage to the feedback signal generator 612 of the PWM controller 610, and controls the switching transistor Qsw using the voltage, thereby more accurately detecting an output DC voltage of the output unit 620.

Figure 6:
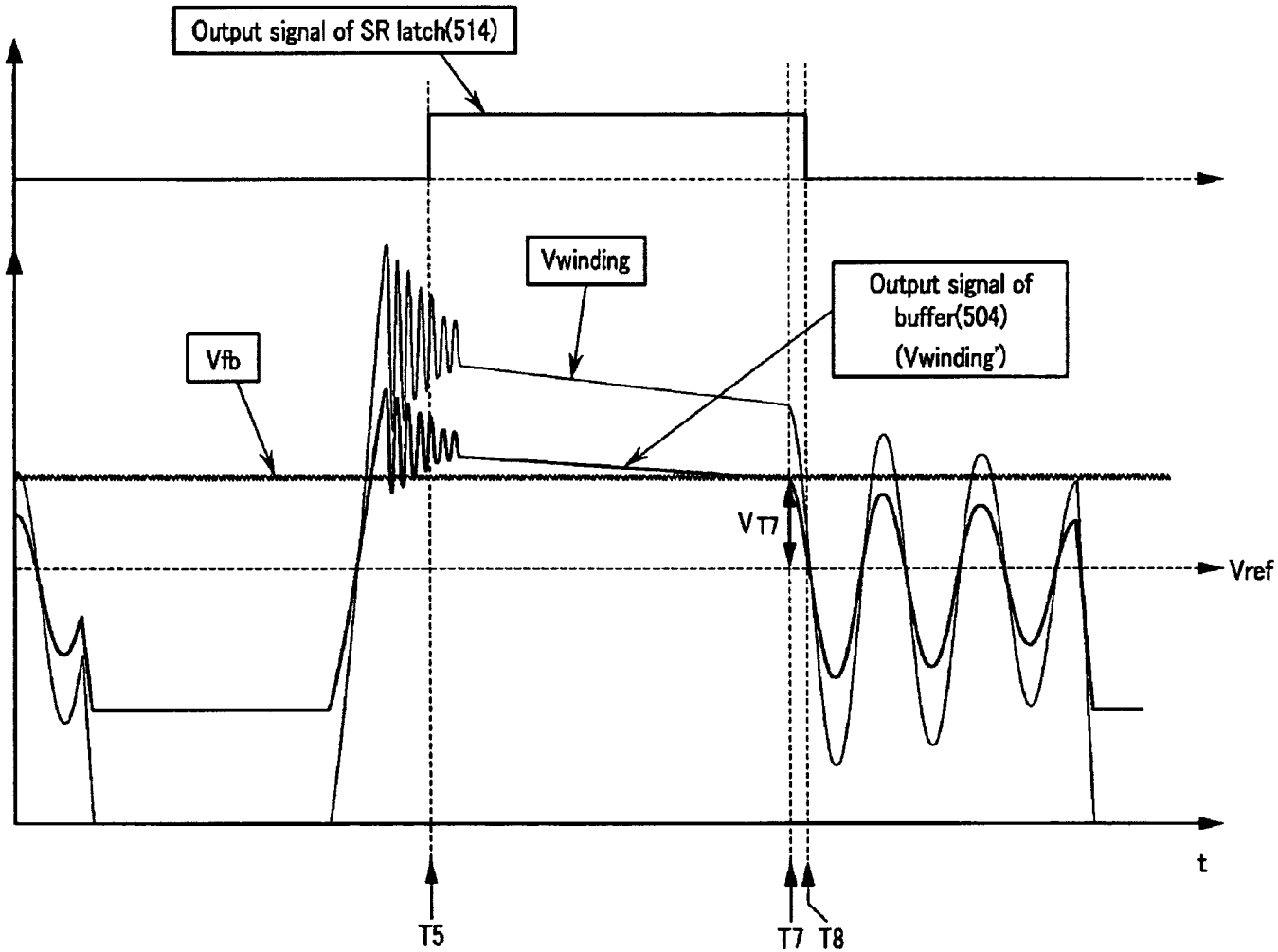
FIG. 6 is a diagram illustrating a waveform of a feedback signal, outputted by the feedback signal generator according to an embodiment of the present invention.

FIG. 6 is a diagram illustrating measured waveforms of a feedback signal that is output from embodiments of the feedback signal generator. As illustrated in FIG. 6, the feedback signal Vfb, output from the feedback signal generators (500 of FIG. 1 or 612 of FIG. 5) of the SMPS, is approximate value of $V_{T7}$. Therefore, an output DC voltage of the output units (200 of FIG. 1 or 620 of FIG. 5) can be accurately detected using the SMPS.

While this invention has been described in connection with certain embodiments, it is understood that the invention is not limited to the disclosed embodiments, but, on the contrary, is intended to cover various modifications and equivalent arrangements, and thus is limited only by the appended claims.

In embodiments, by sensing an output voltage using a gate control signal and a voltage, applied to the secondary side L3 of the transformer that is included in an isolated SMPS and controlling the duty or on-time of the switching transistor through the output voltage, it is not necessary to use the widely applied expensive and large devices such as opto-couplers or a shunt regulators. Therefore, the resulting SMPS can be highly integrated and inexpensive.

Further, by directly distributing a voltage in some embodiments, that is applied to both ends of the inductor L1 of the output unit 620 of a non-isolated SMPS, transferring a distributed voltage to the feedback signal generator 612 of the PWM controller 610, and controlling the switching transistor Qsw using the voltage, an output DC voltage of the output unit 620 can be more accurately detected.

What is claimed is:

1. A switching mode power supply comprising:

a power supply unit comprising a switching transistor, coupled to a primary coil at a primary side of a transformer for converting an input DC voltage and that supplies power to a secondary coil *at a secondary side of the transformer* and a tertiary coil at [a secondary] *the primary* side of the transformer according to an operation of the switching transistor;

a switching controller configured to receive a feedback voltage corresponding to a first voltage generated in the tertiary coil [at the secondary side of the transformer], and to receive a detection signal corresponding to a current flowing to the switching transistor to generate a switching control signal for controlling the turn on/off of the switching transistor; and a feedback signal generator configured to receive the first voltage and the switching control signal to set a sampling period, and to set a voltage level of the first voltage that is sampled by one pulse of a first pulse string within the sampling period as a feedback voltage, using a plurality of pulse strings comprising the first pulse string and a second pulse string, having a plurality of pulses.

2. The switching mode power supply of claim 1, configured to toggle the plurality of pulse strings with different timing.

3. The switching mode power supply of claim 1, configured so that the second pulse string comprises a first pulse that is a most adjacent pulse to an ending time of the sampling period among a plurality of pulses of the plurality of pulse strings, and the one pulse is a pulse that precedes the first pulse.

4. The switching mode power supply of claim 3, wherein the one pulse is a pulse that immediately precedes the first pulse.

5. The switching mode power supply of claim 4, wherein the feedback signal generator comprises:

a first signal generator configured to receive the switching control signal to generate a first signal;

a first logical operation unit configured to receive the first voltage and a reference voltage to a first terminal and a second terminal respectively, and makes comparison between the first voltage and the reference voltage to generate a second signal;

a second logical operation unit configured to receive the second signal and the first signal to a third terminal and a fourth terminal respectively, and configured to invert an output signal in [an immediately] *a* preceding state at a first time in which the second signal is in a first level and the first signal changes to a second level and at a second time in which the first signal is in a third level and the second signal first changes to a fourth level after the first time;

a pulse string generator configured to generate the plurality of pulse strings;

a sampling unit configured to store a voltage level of the first voltage corresponding to pulses of the plurality of pulse strings during a period from the first time to the second time; and a sampling signal output controller configured to output a voltage level of the first voltage that is sampled with the one pulse.

6. The switching mode power supply of claim 5, wherein the first signal generator is configured to generate the first signal a seventh level during a first period corresponding to a time at which the switching control signal changes from a fifth level to a sixth level, and to generate the first signal eighth level during a second period that is a period off the first period, and the second logical operation unit is configured to set the sampling period by performing a logical operation between the first signal and the second signal.

7. The switching mode power supply of claim 6, wherein the sampling period is configured to start substantially when the first signal changes from the eighth level to the seventh level.

8. The switching mode power supply of claim 6, wherein the first logical operation unit is configured to generate the second signal ninth level when the first voltage is higher than the reference voltage, and is configured to generate the second signal tenth level when the first voltage is lower than the reference voltage.

9. The switching mode power supply of claim 8, wherein the sampling period ends at a time that the second signal changes from the ninth level to the tenth level.

10. The switching mode power supply of claim 8, wherein the first signal changes to the seventh level after the second signal changes from the tenth level to the ninth level, and returns to the eighth level before a time of ending of the sampling period.

[11. The switching mode power supply of claim 8, wherein the reference voltage is a ground voltage.]

12. The switching mode power supply of claim 8, wherein the first signal changes from the eighth level to the seventh level at the first time and the second signal changes from the ninth level to the tenth level at the second time, as a voltage that is applied to the switching transistor starts resonance.

13. The switching mode power supply of claim [11] *8*, wherein the sampling unit comprises:

third logical operation units configured to receive an output signal of the second logical operation unit and one of the plurality of pulse strings to perform an AND operation; and latches that receive an output signal of the third logical operation units as a driving timing signal and that sample a voltage level of the first voltage when the driving timing signal changes to an eleventh level, wherein the number of third logical operation units and latches corresponds to that of the plurality of pulse strings.

14. The switching mode power supply of claim 13, wherein the feedback signal generator comprises:

a selection switch that is driven by control of the sampling signal output controller and that is selectively connected to an output terminal of a latch among the latches with one end; and a sampling signal output unit that is connected to the other end of the selection switch to transfer a voltage level that is sampled with the one pulse, which is input through the selection switch to the switching controller.

15. The switching mode power supply of claim 14, wherein the sampling signal output unit is configured to transfers the voltage level to the switching controller until it receives a different voltage level through the selection switch.

16. The switching mode power supply of claim 15, wherein the sampling signal output unit selectively outputs a voltage level that is transferred through the switch according to a driving timing signal that is input from the sampling signal output controller.

17. The switching mode power supply of claim 16, wherein the sampling signal output controller applies a control signal to the switch at the second time and transfers a driving timing signal of a twelfth level to the sampling signal output unit.

18. The switching mode power supply of claim 17, wherein the first level, the third level, the fifth level, the eighth level, the ninth level, the eleventh level, and the twelfth level are corresponding logical high levels, and the second level, the fourth level, the sixth level, the seventh level, and the tenth level are corresponding logical low levels.

19. The switching mode power supply of claim 17, wherein the pulse generator comprises a pulse string generator for generating the plurality of pulse strings, and the sampling signal output controller comprises pulse string input terminals of a the number that corresponds to that of the pulse string generators to receive the plurality of pulse strings through a different pulse input terminal.

20. The switching mode power supply of claim 19, wherein the sampling signal output controller stores the number of pulse string generators and information on the latch corresponding to the pulse string generators, and in the sampling period, the sampling signal output controller stores a pulse input order of the pulse string input terminal for receiving the pulse strings until a number of pulses corresponding to that of the pulse string generators is input from a first input pulse among the plurality of pulse strings that are input through the pulse string input terminal, and connects the switch to an output terminal of a latch corresponding to the one pulse at the second time.

21. The switching mode power supply of claim 20, wherein the feedback signal generator further comprises a filter configured to convert a sudden change of the voltage level that is output from the sampling signal output unit into a substantially linearly changing voltage and transferring the linearly changing voltage to the switching controller.

22. The switching mode power supply of claim 21, wherein the filter is a low pass filter.

23. The switching mode power supply of claim 1, wherein the switching controller is configured to compare the feedback voltage with the detection signal, and to control the switching transistor to turn on/off according to the comparison result to decrease energy that is induced to a secondary side of the transformer if the feedback voltage is higher than a voltage level of the detection signal and increase energy that is induced to a secondary side of the transformer if the feedback voltage is lower than a voltage level of the detection signal.

24. The switching mode power supply of claim 1, wherein the switching transistor, the switching controller, and the feedback signal generator are formed in a single chip.

25. The switching mode power supply of claim 1, wherein the switching controller and the feedback signal generator are formed in a single chip and the switching transistor is formed in a separate chip.

26. A switching mode power supply for generating an output DC voltage by converting a DC voltage, the switching mode power supply comprising:

a PWM controller comprising a switching transistor with a first stage connected to an input terminal of a DC voltage and that controls the switching transistor to drive according to a voltage level of a first voltage corresponding to the output DC voltage;

an output unit comprising an inductor with one end connected to a second stage of the switching transistor[, a capacitor with one end connected to the other end of the inductor, and a diode with an anode connected to the other end of the capacitor and with a cathode connected to one end of the inductor,] *and* the output unit being configured to generate the output DC voltage according to turning on/off of the switching transistor; and a voltage distribution unit configured to distribute a voltage across the inductor to generate the first voltage, wherein the PWM controller further comprises a switching controller configured to receive a feedback voltage corresponding to the first voltage to generate a switching control signal for controlling the switching transistor to turn on/off, and a feedback signal generator configured to receive the switching control signal and the first voltage to set a sampling period and that sets a voltage level of the first voltage that is sampled by one pulse of a first pulse string within the sampling period as a feedback voltage using a plurality of pulse strings comprising the first pulse string and a second pulse string having a plurality of pulses.

27. The switching mode power supply of claim 26, wherein switching mode power supply is configured to toggle the plurality of pulse strings with different timing.

28. The switching mode power supply of claim 26, wherein the second pulse string comprises a first pulse that is a most adjacent pulse to an ending time of the sampling period among a plurality of pulses of the plurality of pulse strings, and the one pulse is a pulse that is preceded the first pulse.

29. The switching mode power supply of claim 28, wherein the one pulse is a pulse that immediately precedes the first pulse.

30. The switching mode power supply of claim 29, wherein the feedback signal generator comprises:

a first signal generator that receives the switching control signal to generate a first signal;

a first logical operation unit that receives the first voltage and a reference voltage to a first terminal and a second terminal respectively, and makes comparison between the first voltage and the reference voltage to generate a second signal;

a second logical operation unit that receives the second signal and the first signal to a third terminal and a fourth terminal respectively, and configured to invert an output signal in an immediately preceding state at a first time in which the second signal is in a first level and the first signal changes to an second level and at a second time in which the first signal is in a third level and the second signal first changes to a fourth level after the first time;

a pulse string generator that generates the plurality of pulse strings;

a sampling unit that stores a voltage level of the first voltage corresponding to pulses of the plurality of pulse strings during a period from the first time to the second time; and a sampling signal output controller that outputs a voltage level of the first voltage that is sampled with the one pulse.

31. The switching mode power supply of claim 30, wherein the first signal generator generates the first signal a seventh level during a first period corresponding to a time at which the switching control signal changes from a fifth level to a sixth level, and generates the first signal eighth level during a second period that is a period off the first period, and the second logical operation unit sets the sampling period by performing a logical operation between the first signal and the second signal.

32. The switching mode power supply of claim 31, wherein the sampling period starts substantially when the first signal changes from the eighth level to the seventh level.

33. The switching mode power supply of claim 31, wherein the first logical operation unit generates the second signal ninth level when the first voltage is higher than the reference voltage, and generates the second signal tenth level when the first voltage is lower than the reference voltage.

34. The switching mode power supply of claim 33, wherein the sampling period ends at a time that the second signal changes from the ninth level to the tenth level.

35. The switching mode power supply of claim 33, wherein the first signal changes to the seventh level after the second signal changes from the tenth level to the ninth level, and returns to the eighth level before a time of ending of the sampling period.

[36. The switching mode power supply of claim 33, wherein the reference voltage is a ground voltage.]

37. The switching mode power supply of claim 33, wherein the first signal changes from the eighth level to the seventh level at the first time and the second signal changes from the ninth level to the tenth level at the second time, as a voltage that is applied to the switching transistor starts resonance.

38. The switching mode power supply of claim 37, wherein the sampling unit comprises:

third logical operation units configured to receive an output signal of the second logical operation unit and one of the plurality of pulse strings to perform an AND operation; and latches that receive an output signal of the third logical operation units as a driving timing signal and that sample a voltage level of the first voltage when the driving timing signal changes to an eleventh level, wherein the number of third logical operation units and latches corresponds to that of the plurality of pulse strings.

39. The switching mode power supply of claim 38, wherein the feedback signal generator comprises:

a selection switch that is driven by control of the sampling signal output controller and that is selectively connected to an output terminal of a latch among the latches with one end; and a sampling signal output unit that is connected to the other end of the selection switch to transfer a voltage level that is sampled with the one pulse, which is input through the selection switch to the switching controller.

40. The switching mode power supply of claim 39, wherein the sampling signal output unit is configured to transfers the voltage level to the switching controller until it receives a different voltage level through the selection switch.

41. The switching mode power supply of claim 40, wherein the sampling signal output unit selectively outputs a voltage level that is transferred through the switch according to a driving timing signal that is input from the sampling signal output controller.

42. The switching mode power supply of claim 41, wherein the sampling signal output controller applies a control signal to the switch at the second time and transfers a driving timing signal of a twelfth level to the sampling signal output unit.

43. The switching mode power supply of claim 42, wherein the first level, the third level, the fifth level, the eighth level, the ninth level, the eleventh level, and the twelfth level are corresponding logical high levels, and the second level, the fourth level, the sixth level, the seventh level, and the tenth level are corresponding logical low levels.

44. The switching mode power supply of claim 42, wherein the pulse generator comprises a pulse string generator for generating the plurality of pulse strings, and the sampling signal output controller comprises pulse string input terminals of a the number that corresponds to that of the pulse string generators to receive the plurality of pulse strings through a different pulse input terminal.

45. The switching mode power supply of claim 44, wherein the sampling signal output controller stores the number of pulse string generators and information on the latch corresponding to the pulse string generators, and in the sampling period, the sampling signal output controller stores a pulse input order of the pulse string input terminal for receiving the pulse strings until a number of pulses corresponding to that of the pulse string generators is input from a first input pulse among the plurality of pulse strings that are input through the pulse string input terminal, and connects the switch to an output terminal of a latch corresponding to the one pulse at the second time.

46. The switching mode power supply of claim 45, wherein the feedback signal generator further comprises a filter configured to convert a sudden change of the voltage level that is output from the sampling signal output unit into a substantially linearly changing voltage and transferring the linearly changing voltage to the switching controller.

47. The switching mode power supply of claim 46, wherein the filter is a low pass filter.

48. The switching mode power supply of claim 26, wherein the switching controller controls the switching transistor to turn on/off according to a voltage level of the feedback voltage to change the output DC voltage.

49. The switching mode power supply of claim 26, wherein the first stage and the second stage of the switching transistor are a drain and a source, respectively.

50. A driving method of a switching mode power supply that supplies power to a secondary coil at a secondary side of the transformer according to an operation of a switching transistor that is coupled to a primary coil at a primary side of a transformer and that generates an output DC voltage by converting an input DC voltage of a primary side of transformer, wherein the [secondary] *primary* side of the transformer comprises [the secondary] *a tertiary* coil[, a first diode with an anode connected to one end of the secondary coil, and a first capacitor with a first stage connected to a cathode of the first diode and with a second stage connected to a ground stage and the other end of the secondary coil], wherein the driving method comprises:

(a) setting a sampling period;

(b) sampling a voltage level of the first voltage that is generated at the [secondary side of the transformer] *tertiary coil* using a plurality of pulse strings comprising a first pulse string having a plurality of pulses; and (c) generating a switching control signal that controls the switching transistor to turn on/off using a voltage level that is sampled by one pulse of the first pulse strings within the sampling period as a feedback voltage among voltage levels that are sampled at step (b).

51. The driving method of claim 50, wherein the one pulse is a previous pulse of a pulse most adjacent to an ending time of the sampling period within the sampling period.

52. The driving method of claim 51, wherein the one pulse is a pulse that immediately precedes the pulse most adjacent to an ending time of the sampling period.

53. The driving method of claim 50, wherein the plurality of pulse strings are toggled with different timing.

54. The driving method of claim 50, wherein step (a) comprises the sampling period is set by a logical operation between a first signal that is sustained a third level during a first period corresponding to a time at which the switching control signal changes from a first level to a second level and sustained a fourth level and sustained a fourth level off the first period, and a second signal set by a result of a comparison between the first voltage and a reference voltage.

55. The driving method of claim 54, wherein the second signal is in a fifth level if the first voltage is higher than the reference voltage and if the first voltage is lower than the reference voltage, the second signal is in a sixth level, and the first signal returns to the fourth level before ending of the sampling period after it changes to the third level, after the second signal changes from the sixth level to the fifth level.

56. The driving method of claim 55, wherein the sampling period starts at a time at which the first signal changes from the fourth level to the third level and ends at a time at which the first signal changes from the fifth level to the sixth level as a voltage that is applied to the switching transistor starts resonance.

57. The driving method of claim 56, wherein the first level, the fourth level, and the fifth level are a high level, and the second level, the third level, and the sixth level are a low level.

58. A driving method of a switching mode power supply for generating an output DC voltage by converting a DC voltage, wherein the switching mode power supply is a non-isolated switching mode power supply that changes the output DC voltage that is output through an output unit according to an operation of a PWM controller that comprises a switching transistor with a first stage connected to an input terminal of the DC voltage, and the output unit comprises an inductor with one end connected to a second stage of the switching transistor, [a capacitor with one end connected to the other end of the inductor, and a first diode with an anode connected to the other end of the capacitor and with a cathode connected to one end of the inductor,]

wherein the driving method comprises:

(a) setting a sampling period;

(b) sampling a voltage level of the first voltage that is generated by distributing a voltage that is applied to both ends of the inductor using a plurality of pulse strings comprising a first pulse string having a plurality of pulses; and (c) generating a switching control signal that controls the switching transistor to turn on/off using a voltage level that is sampled by one pulse of the first pulse string within a sampling period as a feedback voltage among voltage levels that are sampled at step (b).

59. The driving method of claim 58, wherein the one pulse is a previous pulse of a pulse most adjacent to an ending time of the sampling period within the sampling period.

60. The driving method of claim 59, wherein the one pulse is a pulse that immediately precedes the pulse most adjacent to an ending time of the sampling period.

61. The driving method of claim 58, wherein the plurality of pulse strings are toggled with different timing.

62. The driving method of claim 58, wherein at step (a), the sampling period is set by a logical operation between a first signal that is sustained a third level during a first period corresponding to a time at which the switching control signal changes from a first level to a second level and sustained a fourth level and sustained a fourth level off the first period, and a second signal set by a result of a comparison between the first voltage and a reference voltage.

63. The driving method of claim 62, wherein the second signal is in a fifth level if the first voltage is higher than the reference voltage and if the first voltage is lower than the reference voltage, the second signal is in a sixth level, and the first signal returns to the fourth level before ending of the sampling period after it changes to the third level, after the second signal changes from the sixth level to the fifth level.

64. The driving method of claim 63, wherein the sampling period starts at a time at which the first signal changes from the fourth level to the third level and ends at a time at which the first signal changes from the fifth level to the sixth level as a voltage that is applied to the switching transistor starts resonance.

65. The driving method of claim 64, wherein the first level, the fourth level, and the fifth level are a high level, and the second level, the third level, and the sixth level are a low level.

* * * * *